United States Patent [19]

Natansohn et al.

[11] 4,287,159

[45] Sep. 1, 1981

[54] EXTRACTION PROCESS FOR THE RECOVERY OF TUNGSTEN FROM LOW LEVEL SOURCES

[75] Inventors: Samuel Natansohn, Sharon; Sophia R. Su, Wellesley, both of Mass.

[73] Assignee: GTE Laboratories Incorporated, Waltham, Mass.

[21] Appl. No.: 186,948

[22] Filed: Sep. 15, 1980

Related U.S. Application Data

[63] Continuation-in-part of Ser. No. 59,803, Jul. 23, 1979, abandoned, which is a continuation-in-part of Ser. No. 18,488, Mar. 8, 1979, abandoned.

[51] Int. Cl.³ .............................................. C01G 41/00
[52] U.S. Cl. .................. 423/54; 75/101 BE; 423/279; 423/DIG. 14
[58] Field of Search .............. 423/54, DIG. 14, 658.5; 75/101 BE; 423/279, 283

[56] References Cited

U.S. PATENT DOCUMENTS

| | | |
|---|---|---|
| 2,968,527 | 1/1961 | Baker . |
| 3,047,361 | 7/1962 | Hubbard et al. . |
| 3,052,516 | 9/1962 | Drobnick et al. ............... 423/54 |
| 3,158,438 | 11/1964 | Kurtah ............................ 423/54 |
| 3,666,446 | 5/1972 | Cook et al. ..................... 423/54 |
| 3,804,941 | 4/1974 | Coad et al. ..................... 423/54 |
| 3,806,580 | 4/1974 | Bradford et al. ................ 423/54 |
| 3,826,808 | 7/1974 | Nichols et al. .................. 423/54 |
| 4,058,585 | 11/1977 | Mackay et al. .................. 423/54 |
| 4,180,628 | 12/1979 | Marchant et al. ............... 423/54 |

OTHER PUBLICATIONS

Morrison et al., "Solvent Extraction in Analytical Chemistry", John Wiley & Sons, N.Y., 1957, pp. 21–30.
Altringer et al., "Bureau of Mines, RI 8315," Dept. of Interior, 1978, pp. 1–15.
Flaschka et al., "Chelates in Anal. Chemistry," vol. 1, Marcel Dekker, Inc., N.Y., 1967, pp. 332–346.

*Primary Examiner*—Herbert T. Carter
*Attorney, Agent, or Firm*—Jerry F. Janssen

[57] ABSTRACT

A process for recovering tungsten from low level sources such as naturally occurring brines in a form substantially free of contaminating boron comprises adjusting the pH of the source solution to a value below about pH 8, contacting the pH-adjusted solution with an ion exchange resin, preferentially eluting the tungsten values in an aqueous eluate, extracting the eluate solution with an organic extractant comprising o-mercaptobenzoic acid, a quaternary alkylammonium salt and an inert organic solvent, and stripping the tungsten-loaded organic extractant solution with an aqueous basic stripping solution.

13 Claims, No Drawings

EXTRACTION PROCESS FOR THE RECOVERY OF TUNGSTEN FROM LOW LEVEL SOURCES

CROSS-REFERENCE TO RELATED APPLICATIONS

This application is a continuation-in-part of copending application Ser. No. 059,803 filed July 23, 1979, now abandoned which, in turn, is a continuation-in-part of application Ser. No. 018,488 filed Mar. 8, 1979, now abandoned.

This application discloses subject matter relating to that contained in copending application Ser. No. 186,949.

BACKGROUND OF THE INVENTION

This invention relates to the recovery of metals from low level sources. More particularly, it is concerned with a process for recovering tungsten from low level aqueous sources by extraction.

Tungsten is an important component of alloy-hardened metals and is indispensable in the manufacture of electric lamp filaments. The increasing value and scarcity of this vital metal require that efficient and economical means be found for recovering tungsten from low level sources.

Important low level sources of tungsten include the brine of Searles Lake, Calif., and the effluents of hydrometallurgical plants which process tungsten-bearing ores such as scheelite and wolframite. Searles Lake brine, for example, is estimated to contain approximately 170 million pounds of tungsten trioxide, but at a concentration of about 70 parts per million. On the other hand, tungsten ore processing plant effluents contain small but significant concentrations of tungsten, typically on the order of 50 parts per million.

Processes which attempt to recover tungsten from low level sources, however, encounter problems associated with the requirement that large volumes of tungsten-bearing source solution must be handled in order to recover any appreciable amount of tungsten. A number of processes have been suggested for the recovery of tungsten from aqueous solutions containing tungsten values. However, most known processes have one or more of the following disadvantages when applied to the extraction of tungsten from low level sources: (1) the method is non-recyclable, or employs consumable chemicals which contribute to increased costs per pound of tungsten recovered or to the cost of associated waste disposal; (2) the process employs a sulfidizing step which creates odor or sludge waste disposal problems; or (3) the process employs large volumes of extractant to recover tungsten, making the process of limited value for recovering tungsten from low level sources where millions of gallons of the source solution must be handled to recover appreciable amounts of the metal.

SUMMARY OF THE INVENTION

A process for recovering tungsten substantially free of contaminating boron from aqueous media containing tungsten and boron comprises the steps of (a) adjusting the pH of the aqueous tungsten-containing medium to a value below about pH 8, then (b) contacting the pH-adjusted aqueous medium with an ion exchange resin to load the resin with tungsten and boron from the aqueous medium, (c) eluting the loaded resin with an aqueous eluant to selectively recover a portion of the tungsten from said loaded resin, (d) adjusting the pH of the tungsten-containing eluate to a value below about pH 3, (e) contacting the pH-adjusted eluate with an organic extractant comprising o-mercaptobenzoic acid, a quaternary alkylammonium salt, and an inert organic solvent to transfer a portion of the tungsten to the organic extractant solution, (f) contacting the tungsten-containing organic extractant solution with an aqueous stripping solution to transfer a portion of the tungsten to the stripping solution and to regenerate the organic extractant solution, (g) recycling the regenerated organic extractant solution to step e, and (h) recovering the tungsten values from the aqueous stripping solution.

DETAILED DESCRIPTION

According to the process in accordance with the present invention, tungsten is recovered in a form substantially free of contaminating boron from aqueous solutions, such as naturally occurring brines, which contain tungsten and relatively large amounts of boron, usually in the form of borate salts. The tendency of tungsten to form heteropolyanionic species such as $(XW_{12}O_{40})^{-5}$ with elements such as boron and phosphorus is well known. Once formed, these anions are quite stable and it is often difficult to separate the contaminating element in subsequent tungsten processing steps. It is therefore important that when tungsten is isolated from sources which contain elements such as boron and phosphorus, that these elements be removed at as early a stage as possible.

The brine of Searles Lake, Calif., perhaps the most important single source of tungsten in the United States, contains both tungsten and boron, but in concentrations such that the molar ratio of boron to tungsten often exceeds 900 to 1. It is necessary to recover the tungsten from such brines in a form free of boron contamination before the desirable metallurgical properties of tungsten can be effectively utilized.

In accordance with one embodiment of this invention, tungsten is recovered from low level aqueous solutions which contain both boron and tungsten by a process in which the aqueous solution is contacted with an ion exchange resin to absorb both elements from solution. The pH of the tungsten-containing solution is first adjusted to a value below about pH 8, preferably about pH 7.5. A preferred ion exchange resin comprises a copolymer of 8-hydroxyquinoline, ethylenediamine, resorcinol, and formaldehyde of the type disclosed in U.S. Pat. No. 4,180,628. The tungsten containing aqueous solution may be contacted with the resin by either slurrying the resin together with the solution followed by filtration to collect the loaded resin, or by the common technique of passing the tungsten-containing solution through a column of the resin until it is loaded with the metal.

As disclosed in copending application Ser. No. 186,949, the preferred ion exchange resin of 8-hydroxyquinoline, ethylenediamine, resorcinol, and formaldehyde (HERF) adsorbs both tungsten and boron from solutions which contain both elements. Elution of the loaded resin with a dilute aqueous solution of a weak acid salt such as ammonium chloride will remove most of the adsorbed boron from the column leaving the bulk of the tungsten values adsorbed on the column. The tungsten is then desorbed from the column by elution with an aqueous solution of a weak base such as sodium carbonate.

The steps of contacting the tungsten source solution with an ion exchange resin followed by preferential elution of tungsten serve to upgrade the concentration of tungsten and to remove a portion of the contaminating boron in order to enhance the efficiency of subsequent liquid-liquid extraction steps.

The eluate from the ion exchange resin is generally quite basic and is adjusted to a low pH value prior to the step of contacting the eluate with an organic extractant solution to further concentrate the tungsten values. The pH of the tungsten-containing eluate should be reduced to a value below about pH 3.

Following adjustment of the pH of the aqueous tungsten-containing eluate, it is contacted with an extractant solution comprising o-mercaptobenzoic acid, a quaternary alkylammonium salt transfer agent, and an inert organic solvent. The o-mercaptobenzoic acid forms a very stable negatively charged chelate complex with tungsten and shows a high degree of selectivity for tungsten over boron.

An adduct, soluble in organic solvents but insoluble in water forms between the negatively charged chelate complex and the quaternary alkylammonium ion which forms a second component of the organic extractant solution. Suitable transfer agents in the extractant include quaternary alkylammonium salts of the general formula $R_1R_2R_3(CH_3)N^+X^-$ where $R_1$, $R_2$, and $R_3$ are $C_8-C_{10}$ straight chain hydrocarbon groups which may be similar or different in the formula given, and $X^-$ is chloride or bromide ion. A preferred quaternary alkylammonium salt is methyl tricaprylylammonium chloride, available as "Aliquat 336" from General Mills, Chemical Division, 4620 West 77th Street, Minneapolis, MN 55435.

Suitable solvents for the organic extractant solution are selected from $\geq C_7$ hydrocarbons such as toluene, the xylenes, or commercially available hydrocarbon solvent mixtures such as kerosene, or SC#150 solvent. The solvent may additionally contain up to 20 volume percent of a $C_8-C_{10}$ alcohol such as 2-octanol or 1-decanol, preferably about 10 to 15 volume percent.

The concentration of o-mercaptobenzoic acid in the organic extractant solution may range from 2 to 20 times the molar concentration of tungsten in the aqueous eluate solution. It has been found that when tungsten values in the initial brine solution are preconcentrated and partially freed of contaminating boron by first contacting with an ion exchange resin, lower levels of o-mercaptobenzoic acid are required in the extractant. Thus, preferred ranges of o-mercaptobenzoic acid in the organic extractant solution range between 2 and 10 times the molar concentration of tungsten in the aqueous eluate solution.

The volume ratio of aqueous tungsten-containing eluate solution to organic extractant solution is generally in the range of from 10 to 100 parts aqueous solution to 1 part organic extractant. As the data in the following examples show, transfer of the tungsten values from the aqueous to the organic phase in the extraction step is essentially quantitative, indicating the high efficiency of o-mercaptobenzoic acid in extracting tungsten from aqueous solutions.

The tungsten values are stripped from the organic extractant solution with an aqueous solution of a base such as sodium hydroxide or sodium carbonate. The preferred ratio of solution volumes in this step is one part aqueous stripping solution to two parts organic extractant solution. The organic extractant solution is then recycled to contact a fresh portion of aqueous eluate from the ion exchange resin.

The tungsten is contained in the basic aqueous stripping solution in the form of tungstate, and may be recovered as such by evaporation of the solution, by precipitation, or by further processing steps known in the industry.

The process of this invention affords a recyclable method for extracting tungsten from low level sources which produces final solutions containing tungsten essentially free of contaminating boron, and in concentrations which make feasible the further processing of the tungsten by known industrial processes. As shown by the Examples given below, the process of this invention is capable of producing in the final stripping step, solutions containing in excess of 100 g/liter of $WO_3$ in which the boron to tungsten molar ratio is less than 1 mole percent.

Moreover, the process is completely recyclable and thus utilizes a minimum of reagent chemicals, reducing the cost per pound of tungsten recovered and associated waste disposal problems. As indicated by Example VI below, the organic extractant solution employed in the process of this invention is capable of multiple recycling with no indication of loss of extraction efficiency or chemical deterioration.

The following Examples are provided to enable one skilled in the art to practice the present invention and are not to be construed as limiting the scope of the invention, but as merely illustrative thereof.

EXAMPLE I

An artificial brine solution having the composition of Searles Lake brine was prepared by dissolving in water the salts given in Table 1 in the amounts shown.

TABLE 1

| Component | Weight Percent |
| --- | --- |
| NaCl | 17.0 |
| $Na_2SO_4$ | 7.6 |
| KCL | 4.3 |
| $Na_2CO_3$ | 4.2 |
| $Na_2B_4O_7$ | 1.2 |
| $Na_2S$ | 0.2 |
| $Na_3PO_4$ | 0.07 |
| $Na_2WO_4 \cdot 2H_2O$ | 0.0088 |
| Water | (sufficient to make 100%) |

The resulting solution had a pH value of 9.8 and contained boron and tungsten in a molar ratio of about 900 to 1.

EXAMPLE II

A sample of copolymer resin of 8-hydroxyquinoline, ethylenediamine, resorcinol, and formaldehyde (HERF resin) was prepared in accordance with the teachings of U.S. Pat. No. 4,180,628. An ion exchange column was prepared of $-50+20$ mesh HERF resin, the column having a cross-sectional area of 0.67 cm$^2$ and a bed volume of 8 cm$^3$.

Synthetic Searles Lake brine, prepared as described in Example I was adjusted to pH 7.5 by the addition of concentrated sulfuric acid. About 100 bed volumes of this pH-adjusted solution were passed through the ion exchange column at a flow rate of 20 ml min$^{-1}$cm$^2$. The column was then eluted with 4 bed volumes of water to remove the boron from the column, and then with 4 bed volumes of 0.5 M $Na_2CO_3$ solution to elute the tungsten from the column. The eluate containing the tungsten was collected for subsequent treatment by liquid-liquid extraction steps described further below.

The ion exchange column was prepared for re-use by washing with water. Recyclability of the column was demonstrated by its use in 8 full cycles as described above with no loss of extraction efficiency.

The tungsten-containing eluate from the column was $1.8 \times 10^{-3}$ molar in tungsten and $8.1 \times 10^{-3}$ molar in boron representing about a five-fold increase in the tungsten concentration and a two hundred-fold decrease in the boron to tungsten molar ratio.

The pH of the tungsten-containing eluate was reduced to pH 3 by the addition of concentrated sulfuric acid. The pH-adjusted solution, comprising 115 ml, was contacted for one hour with 3 ml of an extractant solution consisting of equimolar amounts of o-mercaptobenzoic acid and methyl tricaprylylammonium chloride dissolved in a solvent system consisting of 90 volume percent SC#150 solvent and 10 volume percent 2-octanol. The concentration of o-mercaptobenzoic acid in the organic phase was about 10 times the concentration of tungsten in the aqueous phase. The two phases were separated and analyzed for tungsten content which showed that transfer of the tungsten to the organic phase was essentially quantitative.

The organic phase was stripped by contacting it with half its volume of 6 M aqueous NaOH solution. Again the transfer of tungsten was found to be essentially quantitative. Analysis of the aqueous stripping solution indicated that it contained greater than 90% of the tungsten initially present in the synthetic brine solution, and had a molar ratio of boron to tungsten of only 0.04 to 1.

EXAMPLE III

Natural Searles Lake brine was passed through a HERF ion exchange column as detailed in Example II above. The tungsten was eluted from the column with 0.5 M $Na_2CO_3$ to yield a solution having a pH of about 11.4. The pH of this tungsten-containing eluate was reduced to pH 3 by the addition of concentrated sulfuric acid.

The pH adjusted eluate solution was shaken for 15-30 minutes with an organic extractant solution consisting of equimolar amounts of o-mercaptobenzoic acid and methyl tricaprylylammonium chloride dissolved in SC#150 solvent in a volume ratio of ten volumes of tungsten-containing eluate solution to one volume of organic extractant solution. The o-mercaptobenzoic acid was present in the organic phase in a molar amount which was 2.2 times that of the tungsten in the aqueous phase.

The two phases were separated and individually analyzed for tungsten. The analysis indicated that better than 99.9% of the tungsten had been extracted from the aqueous eluate into the organic phase.

EXAMPLE IV

The steps of Example III were repeated employing an extractant which consisted of equimolar amounts of o-mercaptobenzoic acid and methyl tricaprylylammonium chloride dissolved in a mixed solvent system consisting of 85 volume percent SC#150 solvent and 15 volume percent 1-decanol. After extraction and separation of the organic and aqueous phases, analysis indicated that better than 99.9% of the tungsten had been extracted into the organic phase.

EXAMPLE V

The steps of Example III were repeated to produce an organic tungsten-containing phase. This solution was shaken for 30 minutes with half its volume of 6 M NaOH solution and the two phases were then separated. Analysis of the two phases indicated essentially quantitative transfer of tungsten to the aqueous stripping phase. The aqueous stripping solution contained tungsten in a concentration of about 105 g/liter which represents a twenty-fold increase in tungsten concentration over that of the original source solution. Moreover, the boron to tungsten molar ratio in the aqueous stripping solution was found to be reduced to 0.01 to 1 from the initial value of about 900 to 1 in the brine source solution.

EXAMPLE VI

To evaluate the recyclability of the liquid-liquid extraction steps of the process in accordance with the invention, the stripped organic extractant solution from Example V was contacted with a fresh portion of acidified eluate from the HERF resin extraction step in a ten to one volume ratio of aqueous tungsten-containing eluate solution to recycled organic extractant solution. After 30 minutes contact time between the two phases, they were separated and analyzed for tungsten content which indicated essentially quantitative transfer of tungsten from the aqueous to the organic phase.

The tungsten-loaded organic phase was then contacted with half its volume of 6 M NaOH solution to strip the tungsten from the organic phase. Transfer of tungsten values to the aqueous caustic stripping solution was found to exceed 95%. The organic phase was recycled in the manner described about for an additional five cycles and there was no apparent decrease in the efficiency of extraction. Moreover, UV spectra of the organic phase before and after the repeated cycling of the extractant showed only the characteristic absorption band of o-mercaptobenzoic acid at 312 nm indicating that the extractant was not deteriorated by repetitive use.

While there have been described what are at present considered the preferred embodiments of the invention, it will be obvious to those skilled in the art that various changes may be made therein without departing from the scope of the invention as defined by the appended claims.

What is claimed is:

1. A process for recovering tungsten substantially free of contaminating boron from aqueous media containing tungsten and boron comprising the steps of:
    (a) adjusting the pH of said aqueous medium to a value below about pH 8;
    (b) contacting the pH-adjusted aqueous medium with an ion exchange resin to load the resin with tungsten and boron values from said aqueous medium;
    (c) eluting the loaded resin with an aqueous eluant solution to selectively recover a portion of the tungsten from said loaded resin;
    (d) adjusting the pH of the tungsten-containing aqueous eluate solution to a value below about pH 3;
    (e) contacting the pH-adjusted aqueous eluate solution with an organic extractant solution comprising o-mercaptobenzoic acid, a quaternary alkylammonium salt, and an inert organic solvent to transfer a portion of the tungsten values to the organic extractant solution;

(f) contacting the tungsten-containing organic extractant solution with an aqueous stripping solution to transfer a portion of the tungsten values to said aqueous stripping solution and to regenerate said organic extractant solution;

(g) recycling the regenerated organic extractant solution to step e; and (h) recovering tungsten values from the aqueous stripping solution, whereby the tungsten recovered contains less than 1 mole percent contaminating boron.

2. The process in accordance with claim 1 wherein said o-mercaptobenzoic acid is present in said organic extractant solution in a molar amount of from 2 to 20 times that of said tungsten in said aqueous eluate solution.

3. The process in accordance with claim 1 wherein said quaternary alkylammonium salt comprises a compound of the formula $R_1R_2R_3(CH_3)N^+X^-$ where $R_1$, $R_2$, and $R_3$ are selected from the group consisting of $C_8$ to $C_{10}$ straight chain hydrocarbon groups and X is bromide or chloride.

4. The process in accordance with claim 3 wherein said quaternary alkylammonium salt comprises methyl tricaprylylammonium chloride.

5. The process in accordance with claim 3 wherein said inert organic solvent is selected from the group consisting of $\geq C_7$ hydrocarbons.

6. The process in accordance with claim 5 wherein said inert organic solvent further includes a $C_8$ to $C_{12}$ alcohol.

7. The process in accordance with claim 4 wherein said aqueous stripping solution comprises sodium hydroxide.

8. A process for recovering tungsten substantially free of contaminating boron from aqueous media containing tungsten and boron comprising the steps of:

(a) adjusting the pH of said aqueous medium to a value below about pH 8;

(b) contacting the pH-adjusted aqueous medium with an ion exchange resin comprising a copolymer of 8-hydroxyquinoline, ethylenediamine, resorcinol, and formaldehyde to load said resin with tungsten and boron values from said aqueous medium;

(c) eluting the loaded resin with an aqueous eluant solution to selectively recover a portion of the tungsten from said loaded resin;

(d) adjusting the pH of the tungsten-containing aqueous eluate solution to a value below about pH 3;

(e) contacting the pH-adjusted aqueous eluate solution with an organic extractant solution comprising o-mercaptobenzoic acid, a quaternary alkylammonium salt, and an inert organic solvent to transfer a portion of the tungsten values to the organic extractant solution;

(f) contacting the tungsten-containing organic extractant solution with an aqueous stripping solution of a base to transfer a portion of the tungsten values to said aqueous stripping solution and to regenerate said organic extractant solution;

(g) recycling the regenerated organic extractant solution to step e; and (h) recovering tungsten values from the aqueous stripping solution, whereby the tungsten recovered by said process contains less than 1 mole percent contaminating boron.

9. The process in accordance with claim 8 wherein said o-mercaptobenzoic acid is present in said organic extractant solution in a molar amount of from 2 to 20 times that of said tungsten in said aqueous eluate solution.

10. The process in accordance with claim 8 wherein said quaternary alkylammonium salt comprises a compound of the formula $R_1R_2R_3(CH_3)N^+X^-$ where $R_1$, $R_2$, and $R_3$ are selected from the group consisting of $C_8$ to $C_{10}$ straight chain hydrocarbon groups and $X^-$ is bromide or chloride.

11. The process in accordance with claim 10 wherein said quaternary alkylammonium salt is methyl tricaprylylammonium chloride.

12. The process in accordance with claim 10 wherein said inert organic solvent comprises at least 80 volume percent $\geq C_7$ hydrocarbons with the balance comprising a $C_8$ to $C_{12}$ alcohol.

13. The process in accordance with claim 1 or claim 8 wherein said aqueous medium containing tungsten comprises Searles Lake brine.

* * * * *